United States Patent
Lee

(10) Patent No.: US 8,171,832 B2
(45) Date of Patent: May 8, 2012

(54) BLIND CUTTING MACHINE

(75) Inventor: Wen-Yeu Lee, Tainan (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 502 days.

(21) Appl. No.: 12/484,794

(22) Filed: Jun. 15, 2009

(65) Prior Publication Data

US 2010/0313726 A1 Dec. 16, 2010

(51) Int. Cl.
*B26D 7/02* (2006.01)

(52) U.S. Cl. .................. 83/200; 83/454; 83/635; 83/923

(58) Field of Classification Search .................... 83/200, 83/454, 466.1, 468.4, 468.8, 468.93, 468.94, 83/563, 565, 633–635, 821, 923
See application file for complete search history.

(56) References Cited

U.S. PATENT DOCUMENTS

| | | | | |
|---|---|---|---|---|
| 5,816,126 A * | 10/1998 | Pluber | ............................ | 83/167 |
| 6,089,134 A * | 7/2000 | Marocco | ......................... | 83/197 |
| 6,314,851 B1 * | 11/2001 | Graves et al. | .................... | 83/553 |
| 6,615,698 B2 * | 9/2003 | Chuang et al. | ..................... | 83/24 |
| 6,681,673 B1 | 1/2004 | Kutchmarek et al. | | |
| 6,688,204 B2 * | 2/2004 | Huang | ............................. | 83/622 |
| 6,761,099 B2 | 7/2004 | Lin et al. | | |
| 7,107,889 B2 * | 9/2006 | Marocco | ........................ | 83/198 |
| 7,752,724 B2 * | 7/2010 | Kollman et al. | ............... | 29/24.5 |
| 2004/0065182 A1 * | 4/2004 | Lin | ................................ | 83/613 |

* cited by examiner

*Primary Examiner* — Edward Landrum
(74) *Attorney, Agent, or Firm* — Morris Manning & Martin LLP; Tim Tingkang Xia, Esq.

(57) ABSTRACT

A blind cutting machine is used to cut a horizontal and a vertical blind. The blind cutting machine includes a table, a first cutting device, a first and a second supporting base. The first cutting device is disposed on the table, and a cutting blade die holder is disposed on a die plate. A first driving mechanism is connected to the cutting blade die holder, so as to drive the cutting blade die holder. A first and a second positioning region of the die plate respectively position elements of the horizontal and the vertical blinds. The cutting blade die holder has a first and a second cutting blade disposed corresponding to the first and the second positioning regions respectively, the first cutting blade has a first cutting edge and a second cutting edge, and the second cutting edge has a vertical cutting portion and has a chamfering portion.

20 Claims, 4 Drawing Sheets

BLIND CUTTING MACHINE

BACKGROUND OF THE INVENTION

1. Field of Invention

The present invention relates to a blind cutting machine, in particular to a cutting machine having a cutting blade set with double cutting edges for cutting and chamfering a headrail, a slat group, and a bottom rail of a window blind, and capable of cutting off a venetian blind and/or a vertical blind.

2. Related Art

Generally, when a window blind manufacturer produces a venetian blind or vertical blind, the window blind is preset to several different sizes for being sold in the market or retail stores. When a consumer buys the window blind in the retail stores, the window blind is cut by a blind cutting machine in the store to the size matching the window in the house of the consumer, such that the consumer may install the window blind in the house by himself or by installers.

Main elements of a common window blind include a headrail, a slat group, and a bottom rail, which are not necessarily made of the same material; for example, the headrail can be made of a relatively firm metal material, the slat group can be made of a relatively light aluminum material or PVC material, and the bottom rail is usually made of the same material as the headrail. When the elements made of the different materials are cut, the cut sections of the different materials have different appearances; therefore, the headrail made of the metal material should be cut with a die cutting blade, and the slat group made of the aluminum or PVC material should be cut with a blade made of a material different from that of the die cutting blade.

In a conventional blind cutting machine, for example, as disclosed in U.S. Pat. Nos. 6,761,099 and 6,681,673, the elements of the window blind are cut by a single die cutting blade. As described above, the cut end surfaces are unsatisfactory inevitably. Therefore, two die cutting blades are needed on a cutting machine respectively cut the headrail and the slat group, so as to meet the special demand on the cut end surfaces of the slat group. Thus, the assembly complexity and the manufacturing cost of the die cutting blades are increased. Further, as the die cutting blades respectively use different driving sources or the same driving source, when the different driving sources are used, the cost of the driving sources are increased, and the operation is more complex.

Further, a blind cutting machine can cut only one type of the window blind, and it is impossible to cut the elements of two types of window blinds on the same blind cutting machine, such that in the limited space of the exhibition place, the usage of the cutting machine cannot be expanded.

In view of the above problems, the inventor proposes a blind cutting machine, which overcomes the defects of the prior art.

SUMMARY OF THE INVENTION

Accordingly, the present invention is directed to a blind cutting machine, capable of cutting off a venetian blind and/or a vertical blind, and having a cutting blade set with double cutting edges for cutting and chamfering on a headrail, a slat group, and a bottom rail of the window blind.

The present invention is further directed to a blind cutting machine, disposed in an exhibition place and capable of being operated to perform a cutting action.

In order to have a further understanding of the objectives and efficacies of the present invention, a detailed description is given below with reference to the embodiments and accompanying drawings.

Definitely, in the present invention, certain elements or the arrangement of the elements may be different, but the selected embodiment is described in detail in the specification, and the structure is shown in the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The technical means for achieving the objectives of the present invention is described in detail below with reference to the embodiment and the accompanying drawings.

Figure 1:
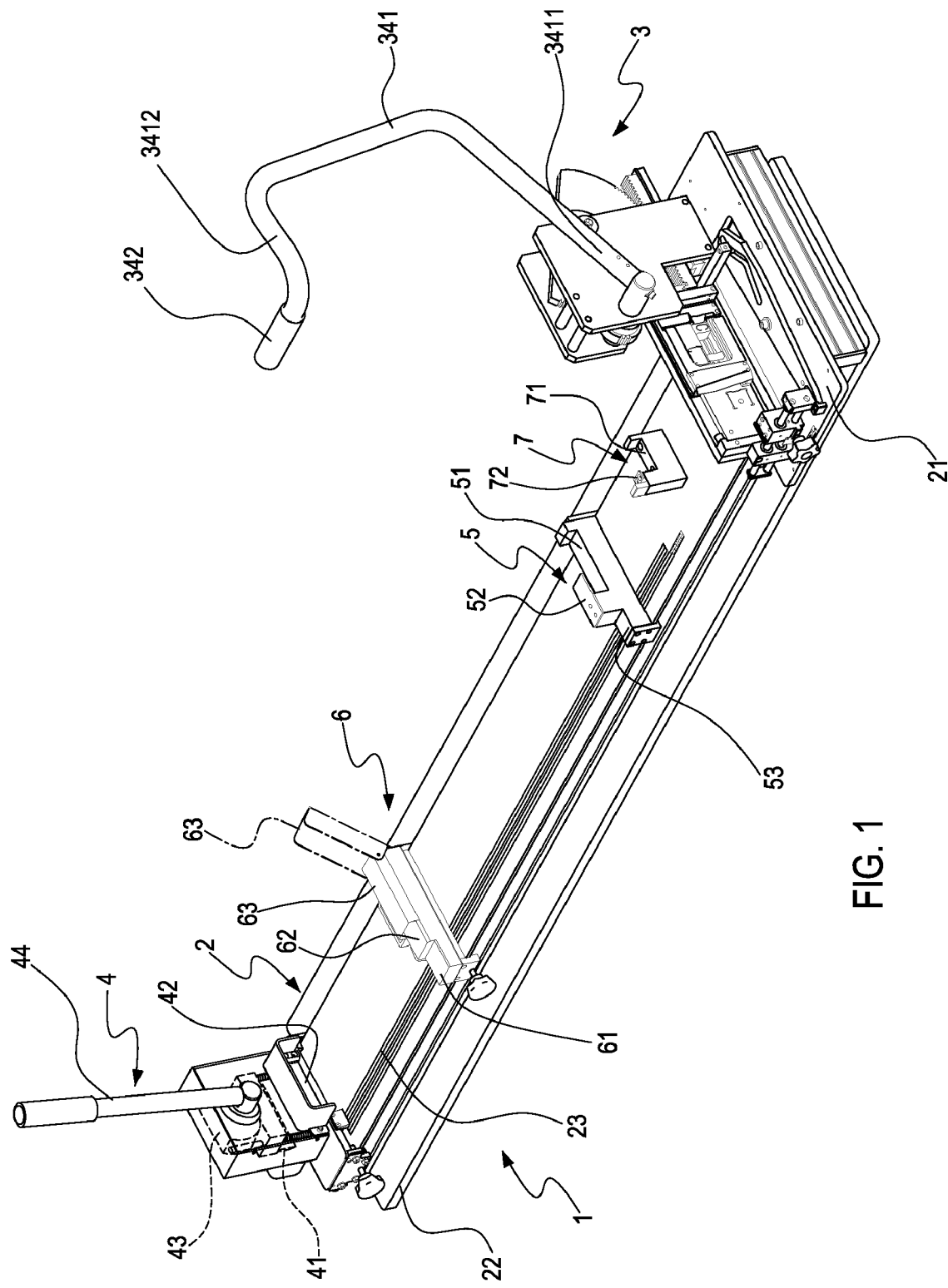
FIG. 1 is a three-dimensional view of an embodiment of the present invention.
Figure 2:
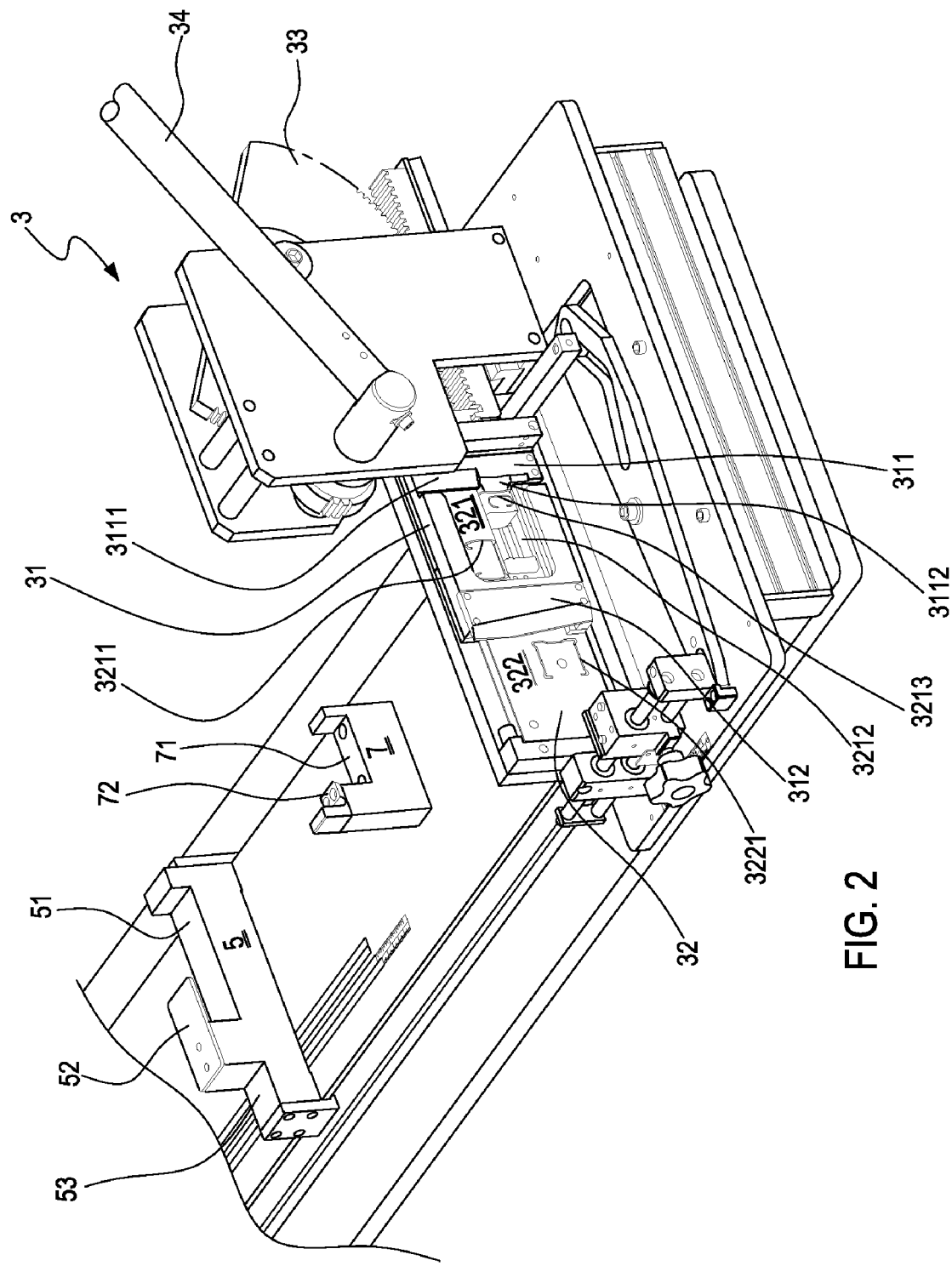
FIG. 2 is a partial three-dimensional view of the embodiment of the present invention.
Figure 3:
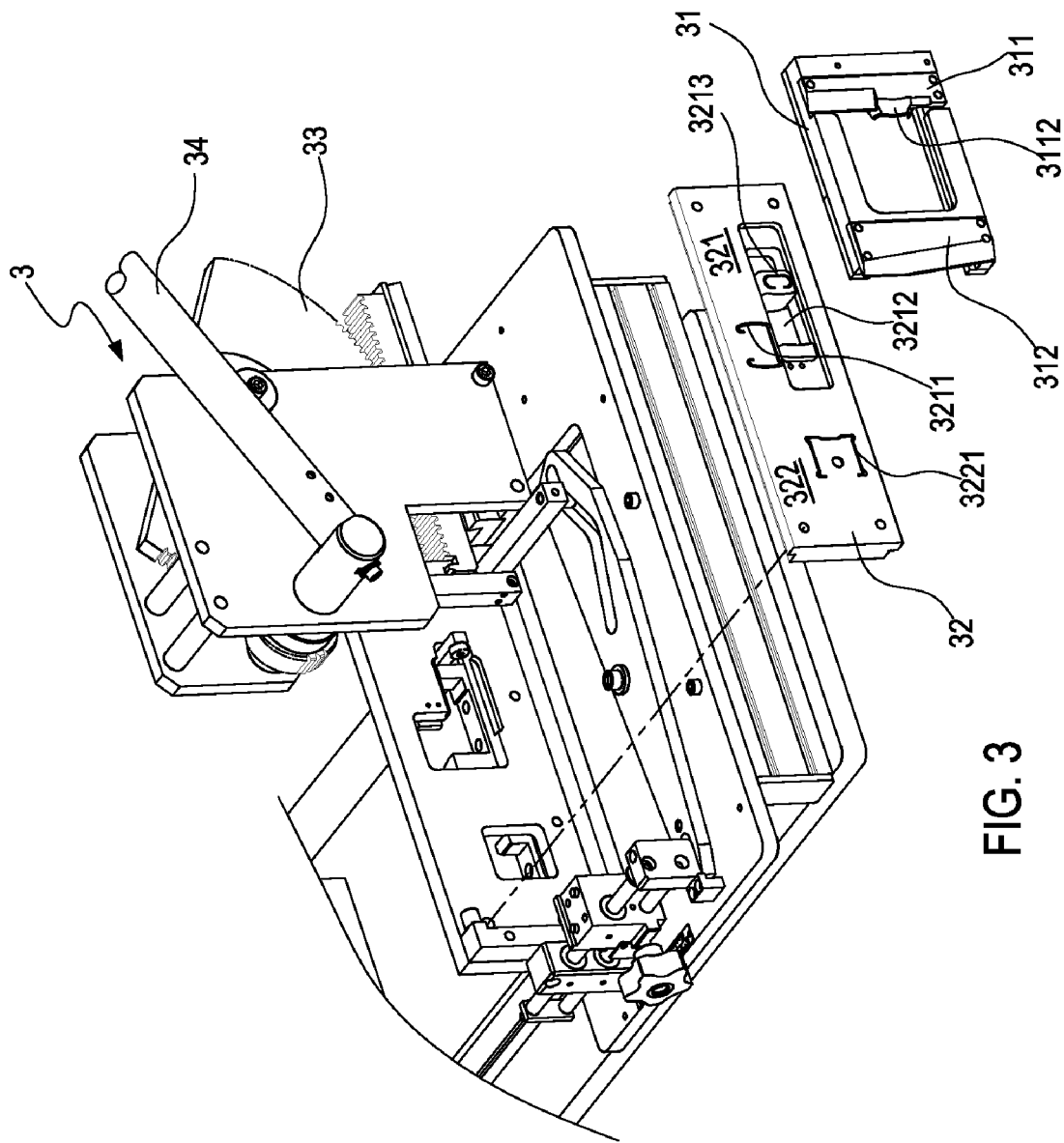
FIG. 3 is a partial exploded view of the embodiment of the present invention.

FIGS. 1, 2, and 3 are a three-dimensional view, a partial three-dimensional view, and a partial exploded view according to an embodiment of the present invention respectively. A blind cutting machine 1 of the present invention is used to cut a size of a horizontal blind (not shown) and/or a vertical blind (not shown), in which the horizontal blind includes a headrail and a slat group, and may further include a bottom rail, and the vertical blind includes a vertical headrail and a vertical slat group.

The blind cutting machine 1 according to this embodiment includes a table 2, a first cutting device 3, a first supporting base 5, and a second supporting base 6, and may further include a second cutting device 4.

The table 2 is a rectangular structure, and has a first end 21 and a second end 22. A measuring-rule 23 is disposed between the first end 21 and the second end 22 for measuring a cut size when the horizontal blind or vertical blind is cut. In addition, the elements of the two window blinds are placed on the table 2 in a direction parallel to a major axis direction, and the elements of the window blinds can be shifted along the major axis direction.

The first cutting device 3 is used to cut the horizontal blind (not shown), is disposed on the first end 21 of the table 2, and has a cutting blade die holder 31, a die plate 32, and a first driving mechanism 33.

The cutting blade die holder 31 is disposed on an outer side of the die plate 32, and the first driving mechanism 33 is connected to the cutting blade die holder 31, so as to drive the cutting blade die holder 31 to shift towards a minor axis direction of the table 2. The die plate 32 has a first positioning region 321 and a second positioning region 322, such that the elements of the horizontal blind and the vertical blind are respectively positioned, in which the elements include the headrail, the slat group, and the bottom rail of the horizontal blind, and the vertical headrail of the vertical blind. A first cutting blade 311 and a second cutting blade 312 are disposed on the cutting blade die holder 31. The first cutting blade 311 is disposed corresponding to the first positioning region 321, and has a first cutting edge 3111 and a second cutting edge 3112, so as to cut and chamfer (described in detail below) the elements of the horizontal blind penetrating the first positioning region 321. The second cutting blade 312 is disposed corresponding to the second positioning region 322, so as to cut the elements of the vertical blind penetrating the second positioning region 322.

The first positioning region 321 has a headrail positioning hole 3211, a slat group positioning hole 3212, and a bottom rail positioning hole 3213, and the headrail, the slat group, and the bottom rail of the horizontal blind respectively pass through the holes and are positioned. The bottom rail positioning hole 3213 is used for holding the bottom rail of the horizontal blind, and the headrail positioning hole 3211 is disposed above the slat group positioning hole 3212. The positioning holes 3211, 3212, and 3213 are arranged in an L shape. The headrail is arranged in a direction perpendicular to the bottom rail/slat group, that is, when the headrail pass through the headrail positioning hole 3211, an U-shaped opening of the headrail faces upwards. At the same time, when the slat group pass through the slat group positioning hole 3212, the slats are arranged in a direction parallel to a moving direction of the first cutting blade and perpendicular to the opening direction of the headrail. The first cutting edge 3111 of the first cutting blade 311 is used to cut off the headrail, the second cutting edge 3112 of the first cutting blade 311 is used to cut off the slat group or together with the bottom rail, and chamfer the slat group for trimming.

Figure 4:
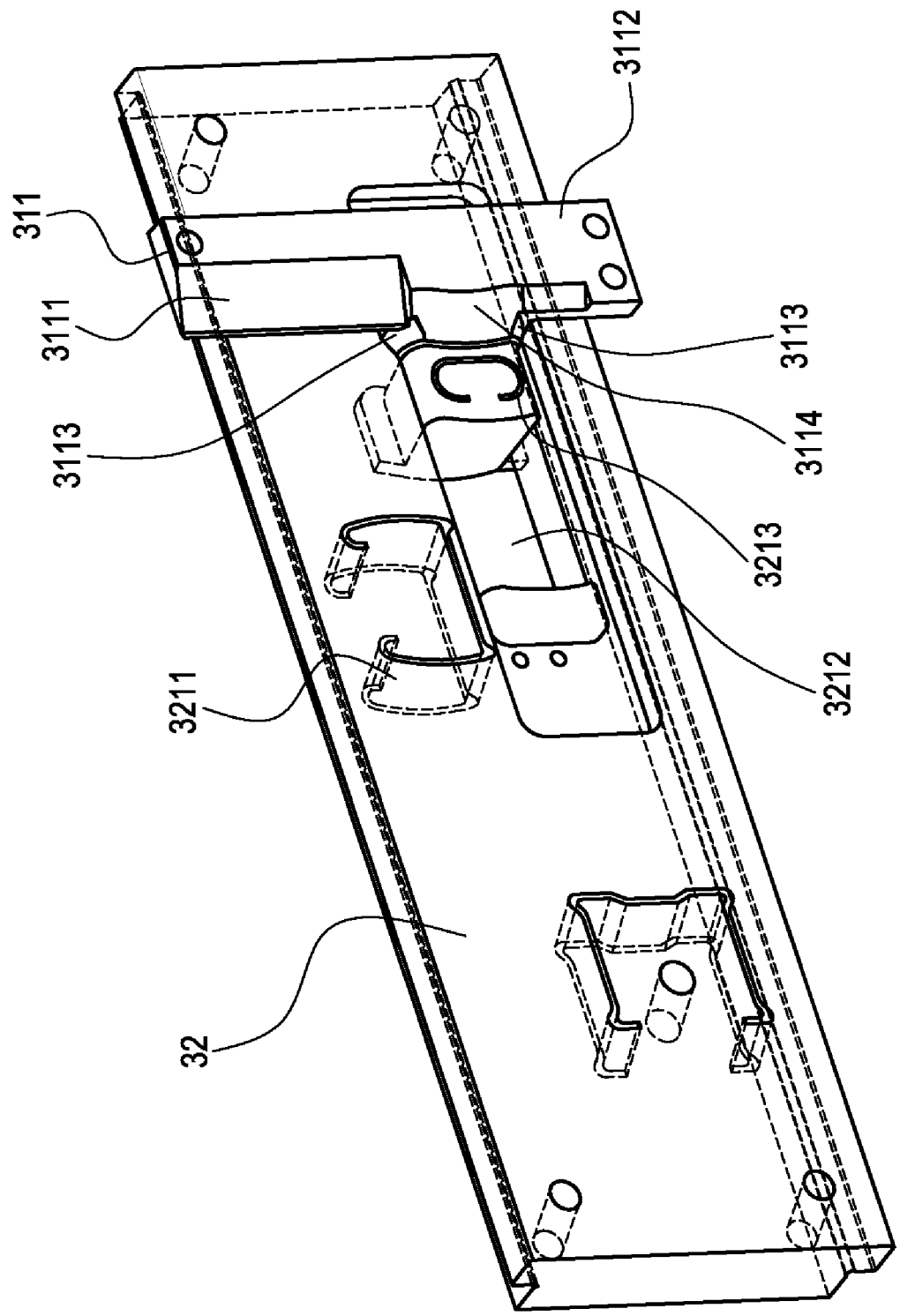
FIG. 4 is a partial perspective view of a first cutting blade region according to the embodiment of the present invention.

FIG. 4 is a partial perspective view of the first cutting blade region according to the embodiment of the present invention. The second cutting edge 3112 of the first cutting blade 311 is approximately in a U shape, and includes a chamfering portion 3113 and a vertical cutting portion 3114. When the first cutting blade 311 is driven by the first driving mechanism 33, the first cutting edge 3111 and the second cutting edge 3112 are moved at the same time. The first cutting edge 3111 cuts the headrail (not shown) penetrating the headrail positioning hole 3211. The vertical cutting portion 3114 of the second cutting edge 3112 cuts the bottom rail (not shown) penetrating the bottom rail positioning hole 3213 and the slat group (not shown) penetrating the slat group positioning hole 3212. When the vertical cutting portion 3114 cuts the slat group, as the corners of the two sides of the slat group are right angles, the chamfering portion 3113 chamfers the right angles on the two sides of the slat group, so as to modify and improve an appearance of the slat group.

In a retail store, the size of a sales counter is limited, and the sales personnel is mostly female, who may perform the cutting; further, the matching between the space for driving the first cutting device and the size of the sales counter must be considered as well. Therefore, the first driving mechanism 33 is further connected to a first handle 34 having a rod portion 341 in an approximate U shape and a grip portion 342. The rod portion 341 has a first end 3411 and a second end 3412, the first driving mechanism 33 is connected to the first end 3411 of the rod portion 341, and the grip portion 342 is vertical, faces towards a direction of the second cutting device 4, and is connected to the second end 3412 of the rod portion 341.

The second cutting device 4 is used to cut the vertical blind (not shown), is disposed on the second end 22 of the table 2, and has a third cutting blade 41, a positioning mechanism 42, and a second driving mechanism 43. The positioning mechanism 42 positions the element (that is, the vertical slat group) of the vertical blind, and the second driving mechanism 43 is connected to the third cutting blade 41, so as to drive the third cutting blade 41 to cut the element (that is, the vertical slat group) of the vertical blind.

The positioning mechanism 42 is used to position the vertical slat group, the third cutting blade 41 is used to cut off the vertical slat group, and the second positioning region 322 has a vertical headrail positioning hole 3221, such that the vertical headrail is positioned, and the first driving mechanism 33 drives the second cutting blade 312 of the cutting blade die holder 31 to cut off the vertical headrail.

The second driving mechanism 43 is further connected to a second handle 44, such that a user applies a force to drive the second driving mechanism 43.

The first supporting base 5 is slidably disposed adjacent to the first cutting device 3 and corresponding to the first positioning region 321, and has a first supporting recess 51, a first bearing table 52, and a first supporting table 53. The first supporting recess 51 is disposed corresponding to the slat group positioning hole 3212, and supports the slat group or together with the bottom rail. The first bearing table 52 is disposed corresponding to the headrail positioning hole 3211, such that the headrail bears against the first bearing table 52. The first supporting table 53 is disposed corresponding to the vertical headrail positioning hole 3221, and is used to support the vertical headrail.

The second supporting base 6 is slidably disposed adjacent to the second cutting device 4 and corresponding to the positioning mechanism 42, and has a rotating part 63 capable of vertically turning corresponding to the table 2, a second bearing table 62, and a second supporting table 61. The second supporting table 61 is disposed corresponding to the second positioning region 322, and is used to support the vertical headrail. The rotating part 63 is rotatably pivoted to the second bearing table 62, and the rotating part 63 is disposed corresponding to the positioning mechanism 42 and the first positioning region 321. When the rotating part 63 and the second bearing table 62 are combined, the headrail and the slat group bear against the rotating part 63, and when the rotating part 63 is turned upwards to be perpendicular to the second bearing table 62, the vertical slat group is placed on the second bearing table 62.

In addition, if the size of the horizontal blind is relatively large, a third supporting base 7 is further disposed between the first supporting base 5 and the first cutting device 3. The third supporting base 7 has a third supporting recess 71 and a third bearing table 72. The third supporting recess 71 is disposed corresponding to the slat group positioning hole 3212, so as to support the slat group or together with the bottom rail. The third bearing table 72 is disposed corresponding to the headrail positioning hole 3211, such that the headrail bears against the third bearing table 72.

Through the above structure, in the limited space of the sales counter, the first handle 34 is turned to rotate the first driving mechanism 33 of the first cutting device 3, so as to drive the cutting blade die holder 31 of the first cutting device 3, and drive the first cutting blade 311 and the second cutting blade 312 to move.

When it is intended to cut the headrail, the slat group, and the bottom rail of the horizontal blind, the headrail is turned upwards for 90 degrees, is placed on the first bearing table 52 of the first supporting base 5 and the third bearing table 72 of the third supporting base 7, is stopped at the rotating part 63 combined with the second bearing table 62 of the second supporting base 6, and pass through the headrail positioning hole 3211 of the first positioning region 321. The slat group and the bottom rail are placed on the first supporting recess 51 of the first supporting base 5 and the third supporting recess 71 of the third supporting base 7, and respectively pass through the slat group positioning hole 3212 and the bottom rail positioning hole 3213 of the first positioning region 321. Then, the first handle 34 is turned to push the first driving mechanism 33 of the first cutting device 3, so as to drive the cutting blade die holder 31 of the first cutting device 3, such that the first cutting edge 3111 of the first cutting blade 311 cuts the headrail, and the second cutting edge 3112 of the first cutting blade 311 cuts off and chamfers the slat group and the bottom rail.

When it is intended to cut the vertical headrail of the vertical blind, the vertical headrail is placed on the second supporting table 61 of the second supporting base 6, and at the same time, the first supporting table 53 of the first supporting base 5 is used to assist for supporting the vertical headrail, and pass through the vertical headrail positioning hole 3221 of the second positioning region 322. Then, the first handle 34 is turned to push the first driving mechanism 33 of the first cutting device 3, so as to drive the cutting blade die holder 31 of the first cutting device 3, such that the second cutting blade 312 cuts the vertical headrail.

Further, when it is intended to cut the vertical slat group of the vertical blind, the rotating part 63 of the second supporting base 6 is vertically rotated to be perpendicular to the second bearing table 62, and the vertical slat group is placed on the second bearing table 62 of the second supporting base 6, pass through the positioning mechanism 42 of the second cutting device 4 and is positioned. Then, the second handle 44 is turned to push the second driving mechanism 43 of the second cutting device 4, so as to drive the third cutting blade 41 of the second cutting device 4 to cut the vertical slats.

The implementation aspects are used to describe the present invention, but are not intended to limit the present invention. The variations of the numerical values and the replacement of the equivalent elements shall fall within the scope of the present invention.

From the above detailed description, those skilled in the art understand that the embodiments of the present invention achieve the objectives described above. Therefore, the present application is filed according to the provisions of the Patent Law.

What is claimed is:

1. A blind cutting machine, for cutting a horizontal blind and/or a vertical blind, wherein the horizontal blind has a headrail, a slat group, and a bottom rail, and the vertical blind has a vertical headrail and a vertical slat group, the blind cutting machine comprising:

a table, wherein the headrail, the slat group and the bottom rail of the horizontal blind and/or the vertical headrail and the vertical slat group of the vertical blind are placed on the table in a direction parallel to a major axis direction;

a first cutting device, disposed on a first end of the table, and having a cutting blade die holder, a die plate, and a first driving mechanism, the die plate has a first positioning region and a second positioning region, the cutting blade die holder has a first cutting blade and a second cutting blade disposed corresponding to the first positioning region and the second positioning region respectively, the first cutting blade has a first cutting edge and a second cutting edge, the first positioning region has at least a headrail positioning hole and a slat group positioning hole, such that the headrail and the slat group of the horizontal blind pass through the holes respectively and are positioned, the first cutting edge of the first cutting blade is used to cut off the headrail, the second cutting edge of the first cutting blade is used to cut off the slat group and/or the bottom rail, and the second cutting blade cuts the vertical headrail of the vertical blind, and the second positioning region has a vertical headrail positioning hole, such that the vertical headrail is positioned; and a second cutting device, disposed on a second end of the table, and having a third cutting blade, a positioning mechanism, and a second driving mechanism, the positioning mechanism is used to position the vertical slat group.

2. The blind cutting machine according to claim 1, wherein when the headrail passes through the headrail positioning hole, an opening of the headrail faces upwards, and at same time, when the slat group passes through the slat group positioning hole, slats of the slat group are arranged in a direction parallel to a moving direction of the first cutting blade and perpendicular to the opening direction of the headrail.

3. The blind cutting machine according to claim 1, further comprising a first supporting base and a second supporting base, wherein the first supporting base is adjacent to the first cutting device and is disposed corresponding to the first positioning region, and the second supporting base is adjacent to the second cutting device and is disposed corresponding to the positioning mechanism.

4. The blind cutting machine according to claim 3, wherein the first supporting base has a first supporting recess, a first bearing table, and a first supporting table, the first supporting recess is disposed corresponding to the slat group positioning hole, and supports the slat group or together with the bottom rail, the first bearing table is disposed corresponding to the headrail positioning hole, and the headrail bears against the first bearing table, and the first supporting table is disposed corresponding to the vertical headrail positioning hole, and is used to support the vertical headrail.

5. The blind cutting machine according to claim 3, wherein the second supporting base has a rotating part capable of vertically turning corresponding to the table, a second bearing table, and a second supporting table, the second supporting table is disposed corresponding to the second positioning region, and is used to support the vertical headrail, the rotating part is rotatably pivoted to the second bearing table, and the rotating part is disposed corresponding to the positioning mechanism and the first positioning region.

6. The blind cutting machine according to claim 5, wherein when the rotating part and the second bearing table are combined, the headrail and the slat group bear against the rotating part, and when the rotating part is turned upwards to be perpendicular to the second bearing table, the vertical slat group is placed on the second bearing table.

7. The blind cutting machine according to claim 3, wherein a third supporting base is further disposed between the first supporting base and the first cutting device, the third supporting base has a third supporting recess and a third bearing table, the third supporting recess is disposed corresponding to the slat group positioning hole, so as to support the slat group or together with the bottom rail, and the third bearing table is disposed corresponding to the headrail positioning hole, such that the headrail bears against the third bearing table.

8. The blind cutting machine according to claim 1, wherein the first driving mechanism is further connected to a first handle having a rod portion in an U shape and a grip portion, the rod portion has a first end and a second end, the first driving mechanism is connected to the first end of the rod portion, and the grip portion is vertical and faces towards a direction of the second cutting device, and is connected to the second end of the rod portion; and the second driving mechanism is further connected to a second handle.

9. The blind cutting machine according to claim 1, wherein the cutting blade die holder is disposed on an outer side of the die plate, the first driving mechanism is connected to the cutting blade die holder, so as to drive the cutting blade die holder to shift towards a minor axis direction of the table; and the second driving mechanism is connected to the third cutting blade, so as to drive the third cutting blade to cut the vertical slat group.

10. The blind cutting machine according to claim 1, wherein the headrail positioning hole is disposed above the slat group positioning hole, the positioning holes are arranged in an L shape.

11. The blind cutting machine according to claim 1, wherein the second cutting edge of the first cutting blade is in an U shape, and has a chamfering portion and a vertical cutting portion, the vertical cutting portion is used to cut off the slat group or together with the bottom rail, the chamfering portion chamfers the slat group.

12. A blind cutting machine, for cutting at least one window blind, wherein the at least one window blind comprises a horizontal blind having a headrail, a slat group, and a bottom rail, the blind cutting machine comprising:
a table, wherein the headrail, the slat group and the bottom rail of the horizontal blind are placed on the table in a direction parallel to a major axis direction; and
a first cutting device, disposed on a first end of the table, and having a cutting blade die holder, a die plate, and a first driving mechanism, the die plate has a first positioning region, the cutting blade die holder has a first cutting blade disposed corresponding to the first positioning region, the first cutting blade has a first cutting edge and a second cutting edge, the first positioning region has at least a headrail positioning hole and a slat group positioning hole, such that the headrail and the slat group of the horizontal blind pass through the holes respectively and are positioned, when the headrail of the horizontal blind pass through the headrail positioning hole, an opening of the headrail faces upwards, when the slat group of the horizontal blind passes through the slat group positioning hole, slats are arranged in a direction parallel to a moving direction of the first cutting blade and perpendicular to the opening direction of the headrail, the first cutting edge of the first cutting blade is used to cut off the headrail, the second cutting edge of the first cutting blade has a chamfering portion and a vertical cutting portion, the vertical cutting portion is used to cut off the slat group or together with the bottom rail, and the chamfering portion chamfers the slat group.

13. The blind cutting machine according to claim 12, further comprising a first supporting base and a second supporting base, wherein the first supporting base is adjacent to the first cutting device and is disposed corresponding to the first positioning region, and the second supporting base is disposed away from the first end of the table.

14. The blind cutting machine according to claim 13, wherein the cutting blade die holder of the first cutting device further comprises a second positioning region, the second positioning region has a vertical headrail positioning hole, such that the vertical headrail is positioned, the cutting blade die holder has a second cutting blade disposed corresponding to the second positioning region, the second cutting blade is driven by the first driving mechanism, so as to cut the vertical headrail, the blind cutting machine further comprises a second cutting device disposed on a second end of the table and having a third cutting blade, a positioning mechanism, and a second driving mechanism, the positioning mechanism is used to position the vertical slat group, and the second driving mechanism is connected to the third cutting blade, so as to drive the third cutting blade to cut the vertical slat group.

15. The blind cutting machine according to claim 14, wherein the first supporting base has a first supporting recess, a first bearing table, and a first supporting table, the first supporting recess is disposed corresponding to the slat group positioning hole, and supports the slat group or together with the bottom rail, the first bearing table is disposed corresponding to the headrail positioning hole, and the headrail bears against the first bearing table, and the first supporting table is disposed corresponding to the vertical headrail positioning hole, and is used to support the vertical headrail.

16. The blind cutting machine according to claim 14, wherein the second supporting base has a rotating part capable of vertically turning corresponding to the table, a second bearing table, and a second supporting table, the second supporting table is disposed corresponding to the second positioning region, and is used to support the vertical headrail, the rotating part is rotatably pivoted to the second bearing table, and the rotating part is disposed corresponding to the positioning mechanism and the first positioning region.

17. The blind cutting machine according to claim 16, wherein when the rotating part and the second bearing table are combined, the headrail and the slat group bear against the rotating part, and when the rotating part is turned upwards to be perpendicular to the second bearing table, the vertical slat group is placed on the second bearing table.

18. The blind cutting machine according to claim 13, wherein a third supporting base is further disposed between the first supporting base and the first cutting device, the third supporting base has a third supporting recess and a third bearing table, the third supporting recess is disposed corresponding to the slat group positioning hole, so as to support the slat group or together with the bottom rail, and the third bearing table is disposed corresponding to the headrail positioning hole, such that the headrail bears against the third bearing table.

19. The blind cutting machine according to claim 12, wherein the cutting blade die holder is disposed on an outer side of the die plate, the first driving mechanism is connected to the cutting blade die holder, so as to drive the cutting blade die holder to shift towards a minor axis direction of the table.

20. The blind cutting machine according to claim 12, the first positioning region further comprising a bottom rail positioning hole for holding the bottom rail of the horizontal blind, wherein the headrail positioning hole is disposed above the slat group positioning hole, the bottom rail positioning hole and the slat group positioning hole are disposed in parallel, and the positioning holes are arranged in an L shape.

* * * * *